(12) United States Patent
Kaneko

(10) Patent No.: US 7,327,062 B2
(45) Date of Patent: Feb. 5, 2008

(54) ROTOR FOR ROTARY ELECTRIC MACHINE

(75) Inventor: Yutaro Kaneko, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/001,065

(22) Filed: Dec. 2, 2004

(65) Prior Publication Data

US 2005/0121990 A1  Jun. 9, 2005

(30) Foreign Application Priority Data

Dec. 8, 2003  (JP) .............. 2003-409205

(51) Int. Cl.
*H02K 21/12* (2006.01)

(52) U.S. Cl. .............. 310/156.57; 310/156.53

(58) Field of Classification Search ............ 310/15.53, 310/156.47, 112, 156.53, 156.25, 156.57
See application file for complete search history.

(56) References Cited

U.S. PATENT DOCUMENTS

| | | | |
|---|---|---|---|
| 5,010,266 A | | 4/1991 | Uchida |
| 5,523,637 A | * | 6/1996 | Miller .................. 310/156.47 |
| 6,218,753 B1 | * | 4/2001 | Asano et al. .......... 310/156.53 |
| 6,242,837 B1 | | 6/2001 | Matsunobu et al. |
| 6,252,323 B1 | | 6/2001 | Nishikawa et al. |
| 6,717,314 B2 | * | 4/2004 | Horst et al. ........... 310/156.43 |
| 6,727,623 B2 | * | 4/2004 | Horst et al. ........... 310/156.57 |
| 6,798,103 B2 | * | 9/2004 | Tajima et al. ......... 310/156.53 |
| 6,858,961 B2 | * | 2/2005 | Tagome et al. ....... 310/156.56 |
| 2002/0047436 A1 | | 4/2002 | Sakai et al. |
| 2002/0117933 A1 | * | 8/2002 | Joong et al. ................ 310/261 |
| 2002/0145353 A1 | * | 10/2002 | Kimura et al. ......... 310/156.57 |

FOREIGN PATENT DOCUMENTS

| | | | |
|---|---|---|---|
| DE | 19851883 A1 | * | 5/2000 |
| EP | 0 901 214 A2 | | 3/1999 |
| EP | 1 233 503 A2 | | 8/2002 |
| JP | 63140645 A | * | 6/1988 |
| JP | 64-64548 A | | 3/1989 |
| JP | 7-336917 A | | 12/1995 |
| JP | 9-131009 A | | 5/1997 |
| JP | 11046464 A | * | 2/1999 |
| JP | 11252840 A | * | 9/1999 |

(Continued)

OTHER PUBLICATIONS

Machine Translation of JP 2000-278895.*

*Primary Examiner*—Dang Le
(74) *Attorney, Agent, or Firm*—Foley & Lardner LLP

(57) ABSTRACT

A rotor (10) for a rotary electric machine (1) comprises a rotation shaft (11), and a plurality of rotor cores (120-129) fixed to the rotation shaft (11) and axially split. The rotor cores (120-129) have outer peripheral surfaces (120A-129A) with a circular cross section. Permanent magnets (13) extending through the rotor cores (120-129) are arranged at equal circumferential intervals. Voids (120B-129B) extending axially through the rotor cores (120-129) are formed between the outer peripheral surfaces (120A-129A) and the permanent magnets (13). The voids (120B-129B) of two adjacent rotor cores (120-129) are formed at circumferentially different positions, thereby being capable of suppressing the cogging torque without introducing a reduction in output torque.

6 Claims, 13 Drawing Sheets

FOREIGN PATENT DOCUMENTS

| | | | |
|---|---|---|---|
| JP | 2000-004550 A | | 1/2000 |
| JP | 2000-116084 A | | 4/2000 |
| JP | 2000278895 A | * | 10/2000 |
| JP | 2001359249 A | * | 12/2001 |
| JP | 2003-23740 A | | 1/2003 |
| JP | 2003-32927 A | | 1/2003 |
| JP | 2003-47186 A | | 2/2003 |

* cited by examiner

ROTOR FOR ROTARY ELECTRIC MACHINE

FIELD OF THE INVENTION

This invention relates to a rotor for a rotary electric machine such as an electric motor, in particular, a rotor having permanent magnets near its outer periphery.

BACKGROUND OF THE INVENTION

A rotary electric machine using a rotor with permanent magnets embedded therein involves little energy loss and provides large output, so it is used in great numbers. However, a rotor with permanent magnets involves generation of a cogging torque. A cogging torque is a retention torque generated when a rotor is rotated slowly. In other words, it is a torque generated when an electric machine is rotated by an external force in a non-energized state. When the cogging torque is large, noise and vibration are generated under low load. Further, when the cogging torque is large, a large torque ripple is involved during normal operation. In particular, the torque ripple is large in the case of a concentrated winding.

In view of this, as shown in FIG. 12, according to JP 2003-32927-A issued by the Japan Patent Office in 2003, short permanent magnets are arranged on a rotor 100 so as to be circumferentially staggered, whereby torque concentration is prevented and the cogging torque is suppressed.

Further, as shown in FIG. 13, according to JP 2003-23740-A issued by the Japan Patent Office in 2003, the outer peripheral surface of a rotor 101 is formed in an approximately arcuate configuration providing an induction voltage having a substantially sinusoidal wave form, whereby the cogging torque is suppressed.

SUMMARY OF THE INVENTION

However, in the construction in which the permanent magnets are staggered, the stator and the rotor differ in polarity, with the result that the general magnetic flux amount decreases, and magnetic flux short-circuiting occurs between the staggered magnets, resulting in a reduction in output torque. Further, the manufacturing step for staggering the magnets is rather complicated.

In the construction in which the outer peripheral surface of the rotor is formed in an approximately arcuate configuration, the overall magnetic resistance increases, and the magnetic flux amount decreases, resulting in a reduction in output torque. Further, since the outer peripheral surface of the rotor is not circular, its production is rather difficult.

It is therefore an object of this invention to provide a rotor for an electric machine which suppresses the cogging torque without involving a reduction in output torque.

In order to achieve the above object, this invention provides a rotor (10) for a rotary electric machine (1) comprises a rotation shaft (11), a plurality of rotor cores (120-129) fixed to the rotation shaft (11) and axially split, each of the rotor cores (120-129) having outer peripheral surfaces (120A-129A) with a circular cross section and permanent magnets (13) arranged at equal circumferential intervals and extending through the rotor cores (120-129), wherein voids (120B-129B) which axially penetrate the rotor cores (120-129) are formed between the outer peripheral surfaces (120A-129A) of the rotor cores (120-129) and the permanent magnets (13), and the voids (120B-129B) of two adjacent rotor cores (120-129) are formed at circumferentially different positions.

The details as well as other features and advantages of this invention are set forth in the remainder of the specification and are shown in the accompanying drawings.

DESCRIPTION OF THE PREFERRED EMBODIMENTS

Figure 1:
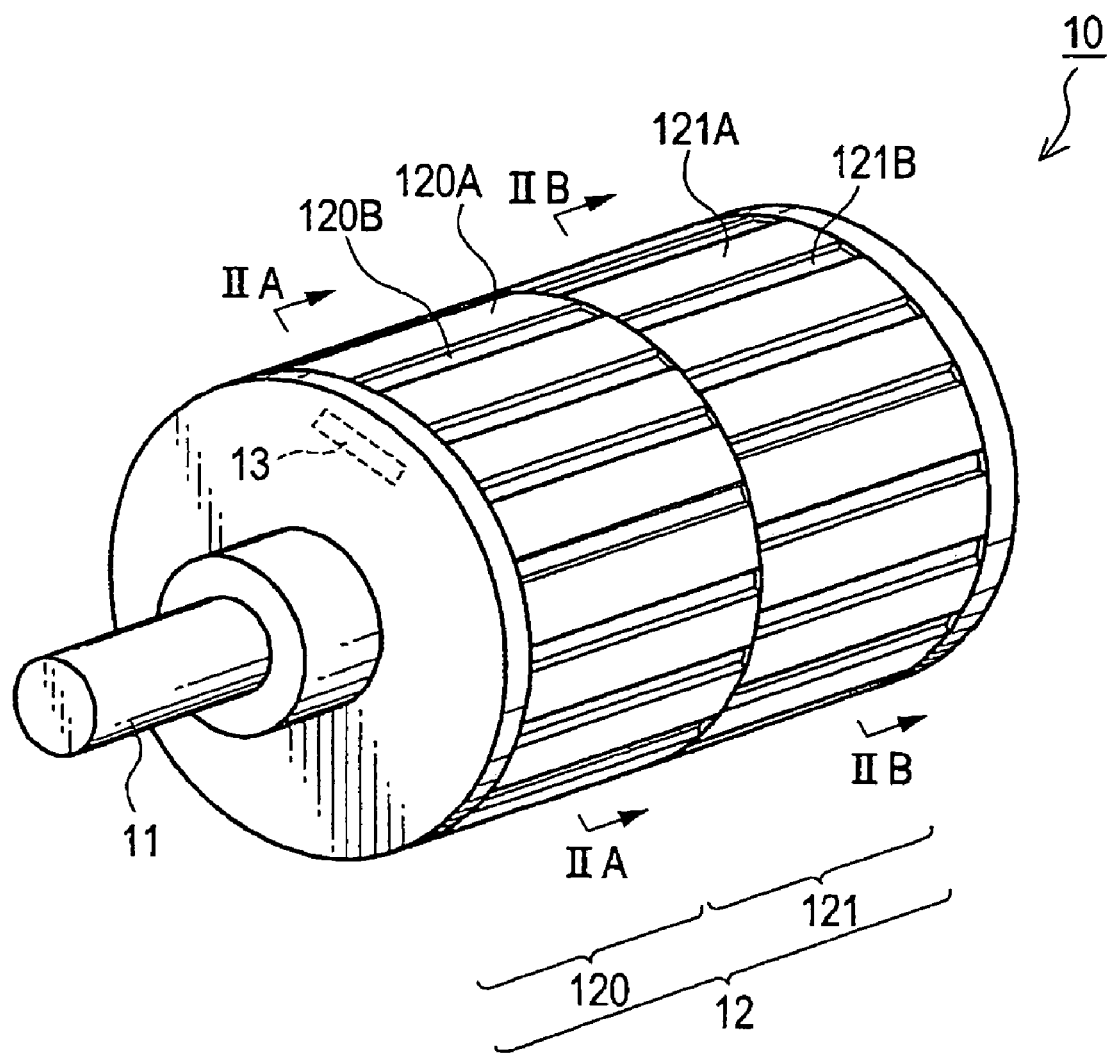
FIG. 1 is a perspective view of a rotor for a rotary electric machine according to a first embodiment of this invention.

Referring to FIG. 1, a rotor 10 comprises a shaft 11, a rotor core unit 12, and permanent magnets 13.

The rotor core unit 12 is provided on the shaft 11. The rotor core unit 12 comprises a first rotor core 120 and a second rotor core 121. The axial lengths of the first rotor core 120 and of the second rotor core 121 are the same or substantially the same. The first rotor core 120 has gaps 120B formed as grooves in an outer peripheral surface 120A thereof. The second rotor core 121 has similar gaps 121B formed as grooves in an outer peripheral surface 121A thereof.

The permanent magnets 13 are provided near the outer peripheral edge of the rotor core unit 12. FIG. 1 shows only one of the permanent magnets 13, indicating it by the broken line.

Figure 2A:
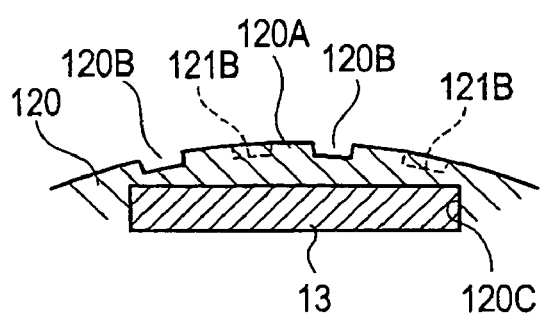
FIGS. 2A and 2B are enlarged partial sectional views of the rotor respectively taken along the lines IIA-IIA and IIB-IIB of FIG. 1.
Figure 2B:
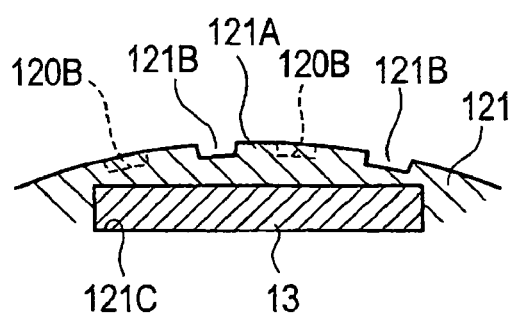

Referring to FIGS. 2A and 2B, the first rotor core 120 has holes 120C, and the second rotor core 121 has holes 121C, with the permanent magnets 13 being inserted into these holes 120C and 121C.

The gaps 120B and the gaps 121B are circumferentially staggered with respect to each other. In other words, when seen through from the axial direction, the gaps 120B and 121B are arranged alternately at equal intervals. Two gaps 120B and two gaps 121B are formed per permanent magnet.

While the first rotor core 120 and the second rotor core 121 may be constructed separately from one another, it is also possible to use rotor cores of the same construction and to arrange them oppositely in the axial direction, with their gaps being staggered circumferentially. This makes it possible to manufacture the rotor cores by a single mold, thereby being capable of decreasing the production cost for the rotor.

The rotor 10 is a component constituting a rotary electric machine 1. Here, a three-phase 8-pole 12-slot concentrated-winding permanent-magnet-type rotary electric machine will be taken by way of example.

Figure 3:
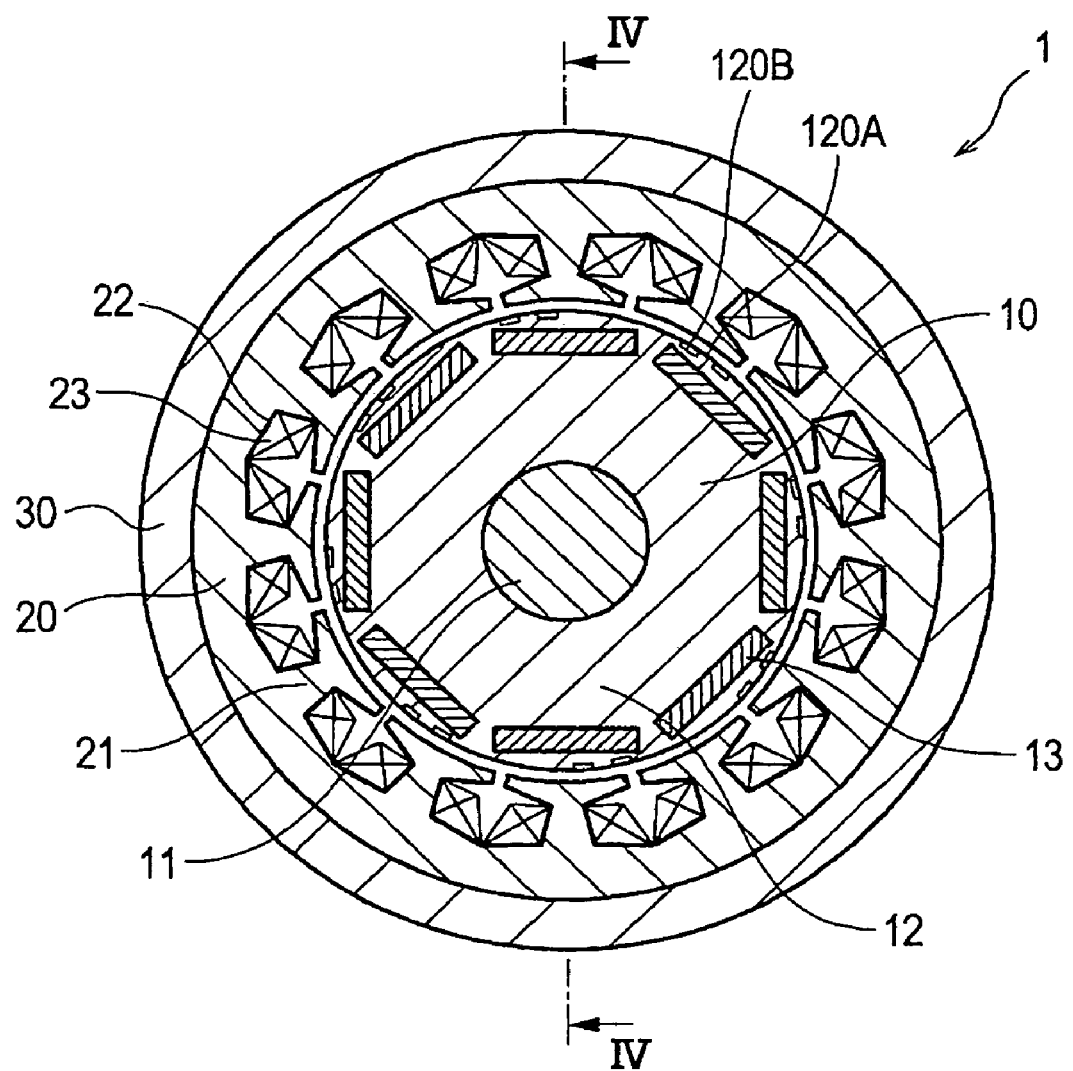
FIG. 3 is a cross-sectional view of the rotary electric machine with the rotor incorporated therein.
Figure 4:
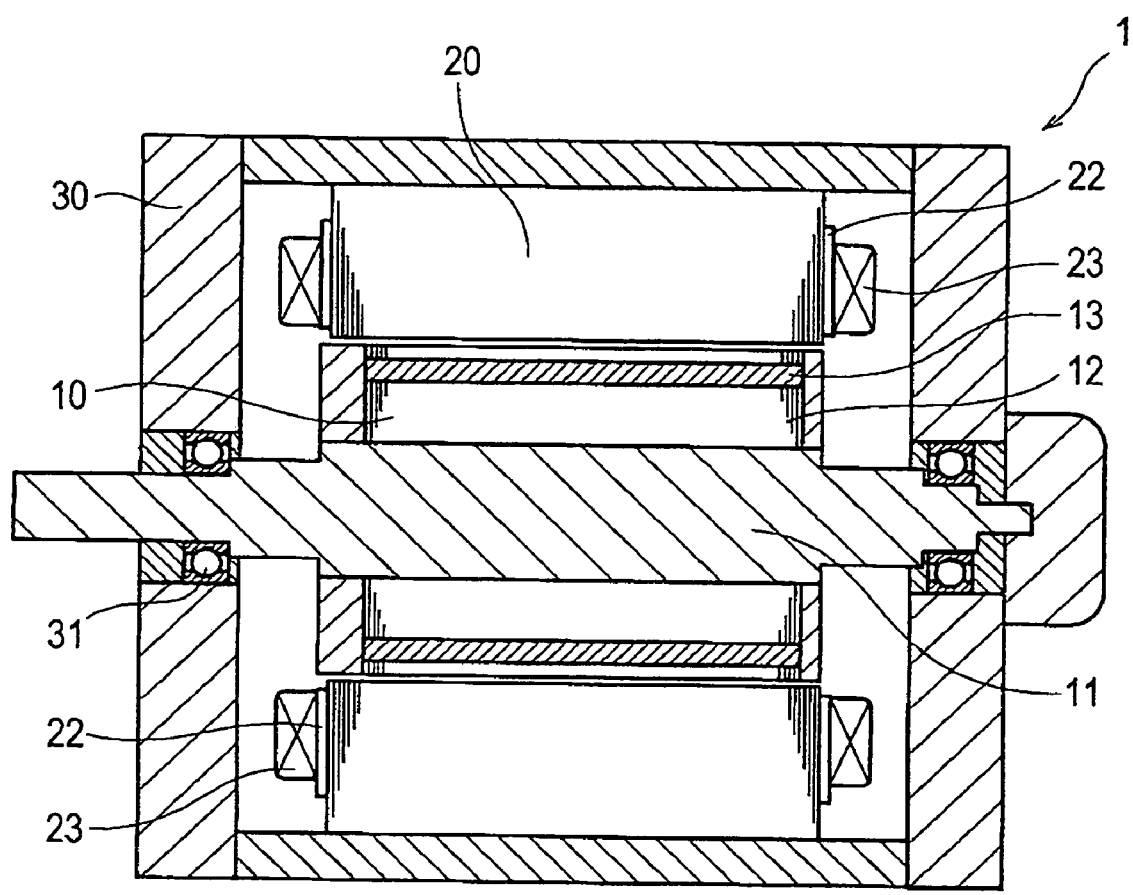
FIG. 4 is a longitudinal sectional view of the rotary electric machine taken along the line IV-IV of FIG. 3.

Referring to FIG. 3 and FIG. 4, the rotary electric machine 1 comprises the rotor 10, a stator 20, and a case 30.

The shaft 11 of the rotor 10 is supported by bearings 31 of the case 30 so as to be free to rotate. The rotor core unit 12 is formed by stacking together electromagnetic steel plates. Eight permanent magnets 13 are uniformly arranged near the outer peripheral edge of the rotor core unit 12. The permanent magnets 13 extend substantially over the entire length of the rotor 10, and, unlike those of the prior art as disclosed in JP-2003-32927-A, involve no reduction in output torque. The permanent magnets 13 are arranged such that the magnetic poles of the adjacent permanent magnets differ from each other. When an electric current flow through windings 23, a magnetic flux is generated, and a reaction force is generated in the permanent magnets 13. As a result, the rotor 10 rotates around the shaft 11. Further, since the outer periphery of the rotor 10 is circular, there is no increase in the general magnetic resistance as in the case of the prior art JP 2003-23740-A. Further, due to its simple configuration, it is easy to manufacture.

The stator 20 is held by the inner wall of the case 30, and is arranged on the outer side of the rotor 10. The stator 20 has twelve teeth 21. The windings 23 are wound around the teeth 21 with insulators 22 therebetween.

Next, referring to FIG. 5 and FIG. 6, the effects of this embodiment will be described. In the drawings, the thick solid lines represent this embodiment, and thin solid lines represent the prior art as disclosed in JP 2003-32927-A, in which no gaps are formed in the outer peripheral surface. The alternate long and short dashed line in FIG. 5 indicates the cogging torque generated by the first rotor core 120, and the dashed line indicates the cogging torque generated by the second rotor core 121.

Figure 5:
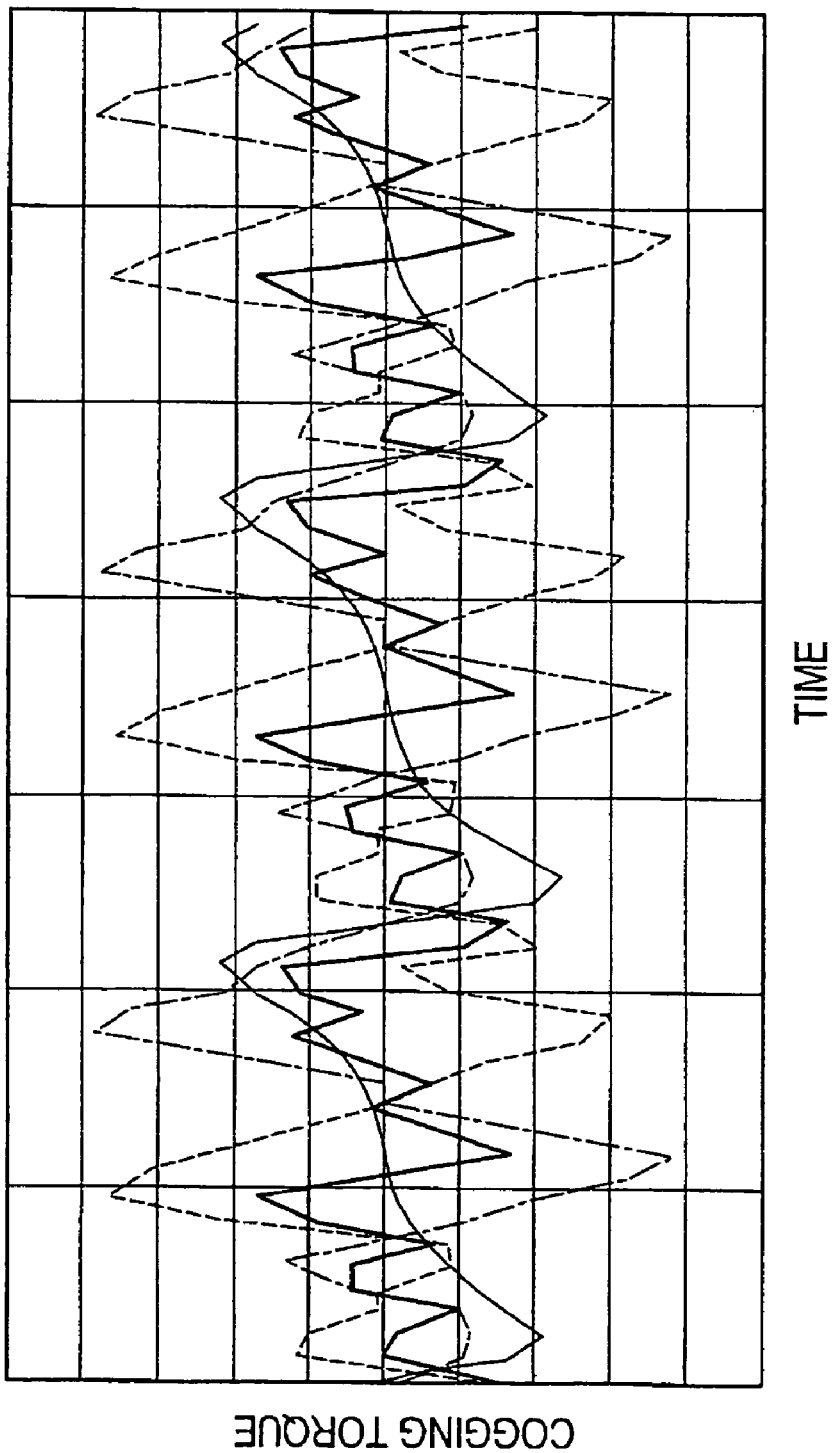
FIG. 5 is a diagram showing fluctuations in cogging torque in the first embodiment and a prior art.

Referring to FIG. 5, the cogging torques inherent in of the first rotor core 120 and the second rotor core 121 are both larger than those of the prior art as disclosed in JP 2003-32927-A. However, through a combination of both, the cogging torques are canceled out, so the cogging torque as a whole is smaller than that in the prior art.

Figure 6:
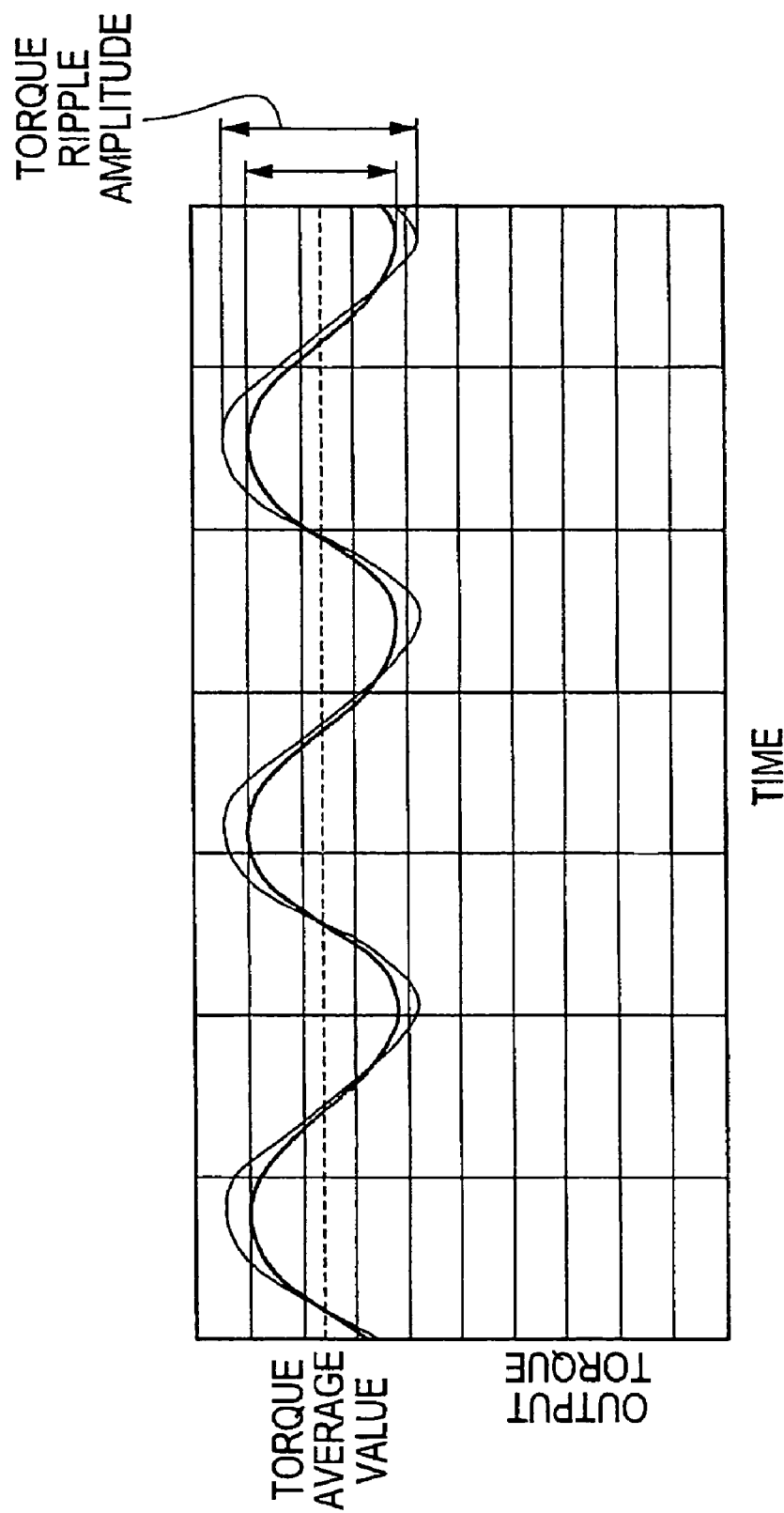
FIG. 6 is a diagram showing fluctuations in output torque in the first embodiment and a prior art.

Referring to FIG. 6, according to this rotor core unit 12, the torque ripple is reduced as compared with the prior art as disclosed in JP 2003-32927-A although the average torque is the same as in the prior art.

Figure 7:
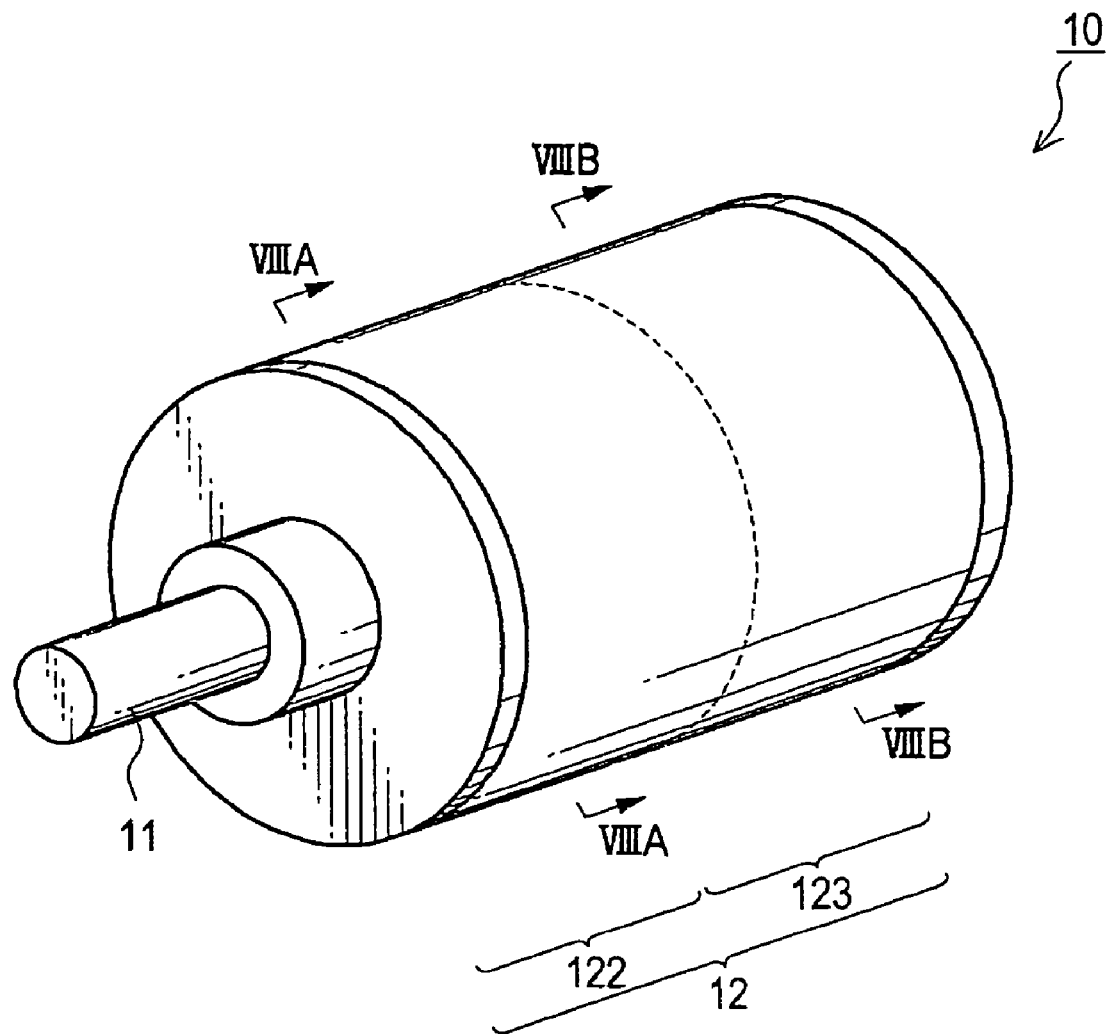
FIG. 7 is a perspective view of a rotor for a rotary electric machine according to a second embodiment of this invention.
Figure 8A:
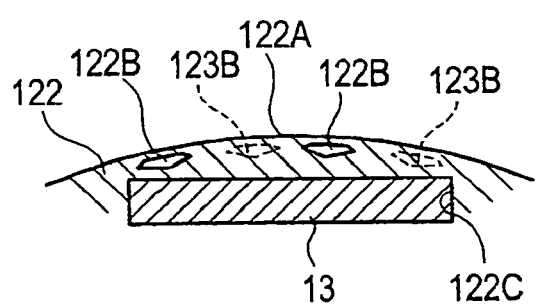
FIGS. 8A and 8B are enlarged partial sectional views of the rotor of FIG. 7, respectively taken along the lines VIIIA-VIIIA and VIIIB-VIIIB thereof.
Figure 8B:
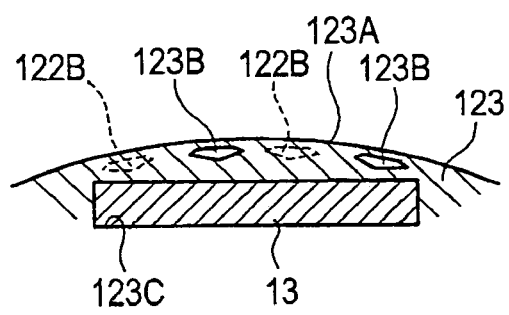

Referring to FIG. 7 and FIGS. 8A and 8B, a second embodiment of this invention will be described. In this embodiment, no gaps are formed in the outer peripheral surface of the rotor 10. Instead, as shown in FIGS. 8A and 8B, through holes 122B are formed between an outer peripheral surface 122A of a first rotor core 122 and the permanent magnets 13, and through holes 123B are formed between an outer peripheral surface 123A of a second rotor core 123 and the permanent magnets 13. When seen through from the axial direction, the through holes 122B and 123B are arranged alternately at equal intervals.

In this embodiment also, it is possible to reduce cogging torque and torque ripple. Further, since no gaps are formed in the outer peripheral surface of the rotor 10, the outer peripheral surface can maintain a circular section, making it possible to prevent generation of noise during rotation or occurrence of energy loss due to air resistance.

In this embodiment also, rotor cores of the same construction may be used as the cores 122 and 123, and arranged axially in opposite directions, with the through holes 122B and 123B being circumferentially staggered with respect to each other, thereby being capable of reducing the production cost for the rotor.

Figure 9:
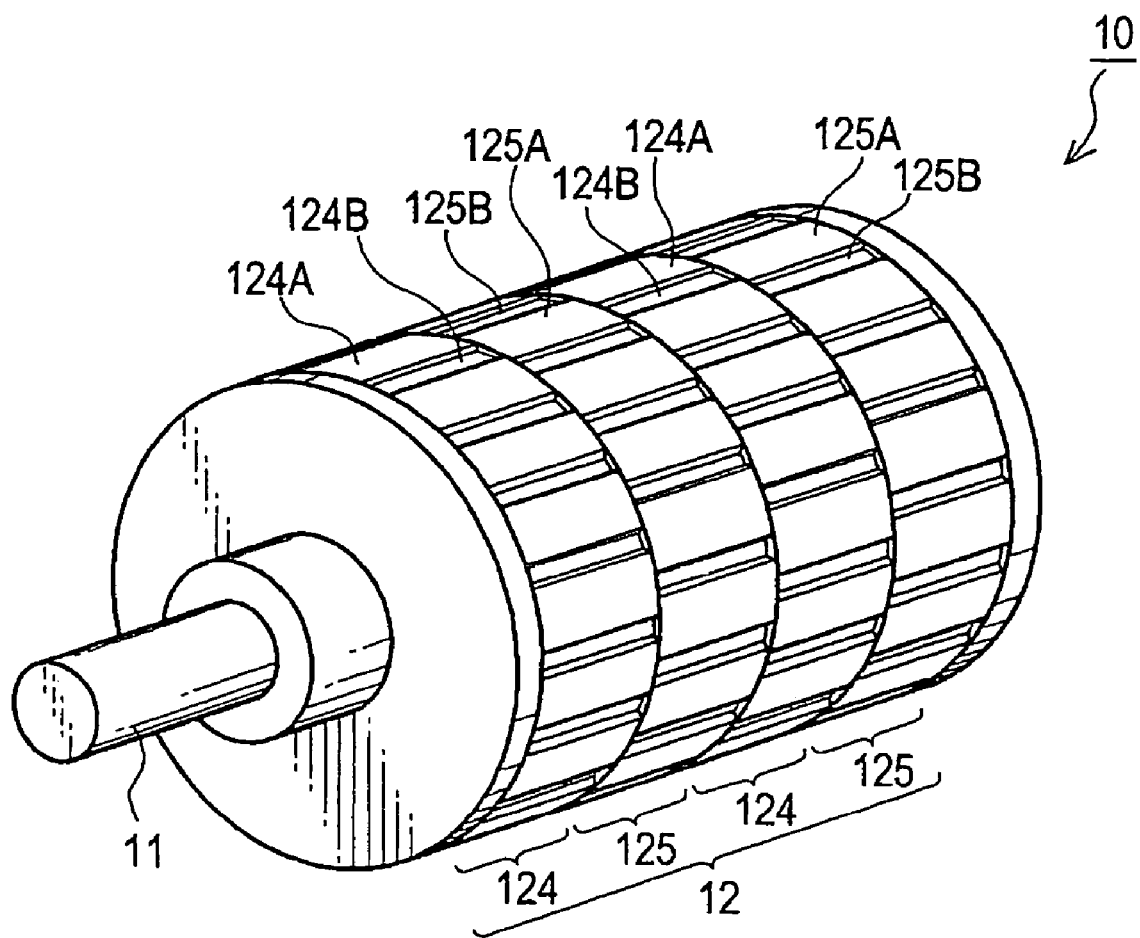
FIG. 9 is a perspective view of a rotor for a rotary electric machine according to a third embodiment of this invention.

Next, referring to FIG. 9, a third embodiment of this invention will be described. This embodiment employs two rotor cores 124 and two rotor cores 125, arranged alternately along the direction of the shaft 11 of the rotor 10 such that circumferential staggering of gaps 124B and 125B with respect to each other occurs at three or more axial positions. In this embodiment also, it is possible to use rotor cores of the same kind as the rotor cores 124 and 125, and arrange them axially in opposite directions, with the gap positions being circumferentially varied.

By thus arranging a number of small-sized rotor cores 124 and 125 along the shaft 11, it is possible to reduce the unbalance in weight.

Figure 10:
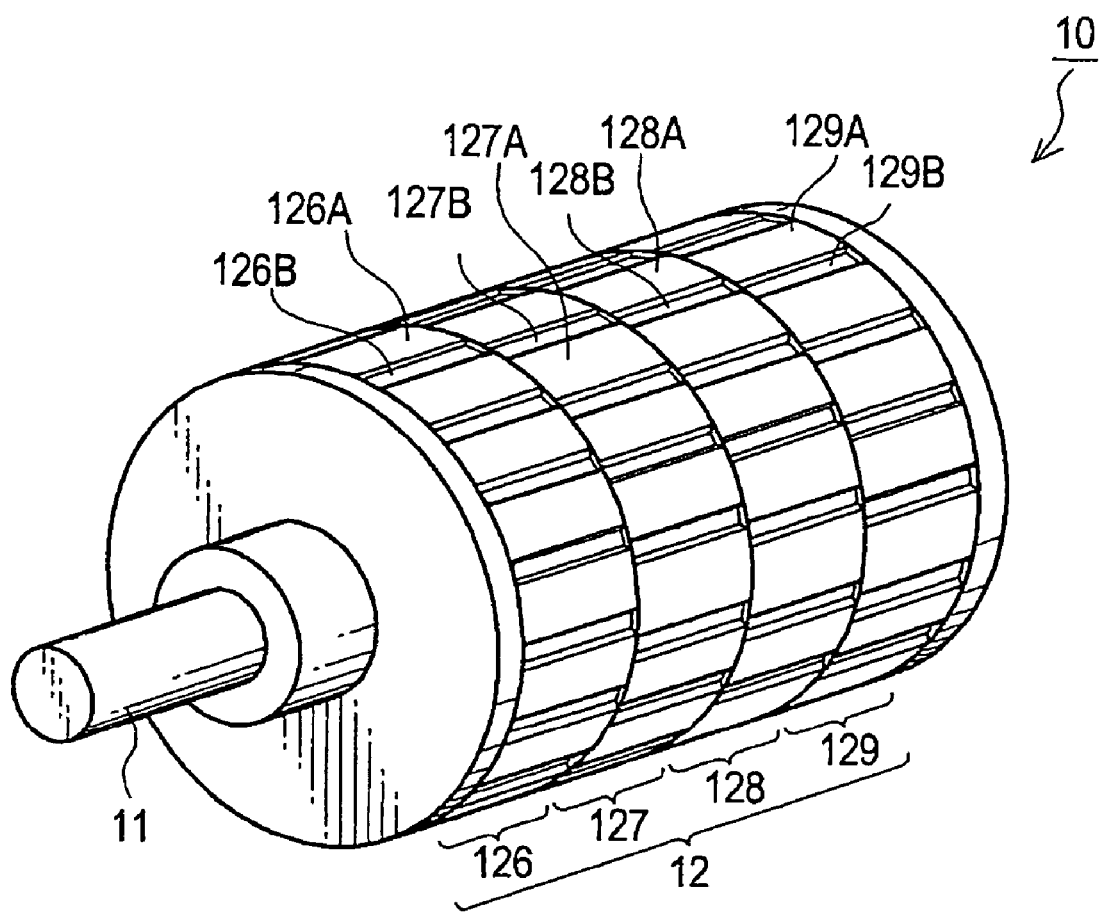
FIG. 10 is a perspective view of a rotor for a rotary electric machine according to a fourth embodiment of this invention.

Next, referring to FIG. 10, a fourth embodiment of this invention will be described. In this embodiment, rotor cores 126, 127, 128, and 129 are used and arranged along the direction of the shaft 11, with their gaps 126B, 127B, 128C, and 129B being gradually staggered with respect to each other in their circumferential positions.

This makes it possible to adjust the cogging torque more accurately and to reduce in cogging torque and torque ripple. In this embodiment, it is possible for the rotor cores 126 through 129 can be of two kinds in view of the constructions thereof. In other words, two rotor cores are arranged oppositely in the axial direction to thereby form the rotor cores 126 and 129. Other two rotor cores are arranged oppositely in the axial direction to thereby form the rotor cores 127 and 128. Due to this construction, it is possible to keep the production cost for the rotor low. Further, while in this embodiment the gap positions are gradually staggered circumferentially, it is also possible to arrange the rotor cores 126, 128, 127, and 129 in that order from the axial forward end. In other words, it is not always necessary to effect gradual staggering along the axial direction as long as the rotor cores are arranged such that their circumferential gap positions differ.

Further, while in this embodiment four kinds of rotor cores 126 through 129 are used, a similar arrangement is also possible with three or more kinds of rotor cores.

Figure 11A:
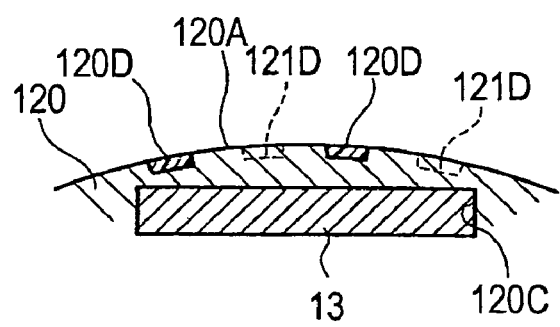
FIGS. 11A and 11B are enlarged partial sectional views, similar to FIGS. 2A and 2B, of a rotor for a rotary electric machine according to a fifth embodiment of this invention.
Figure 11B:
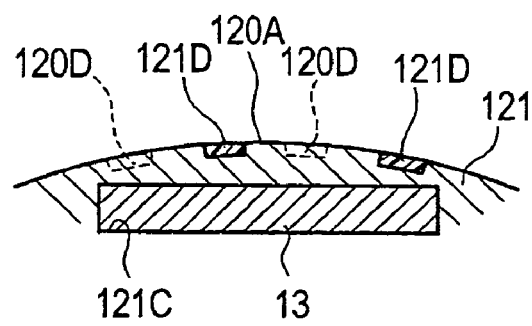
Figure 12:
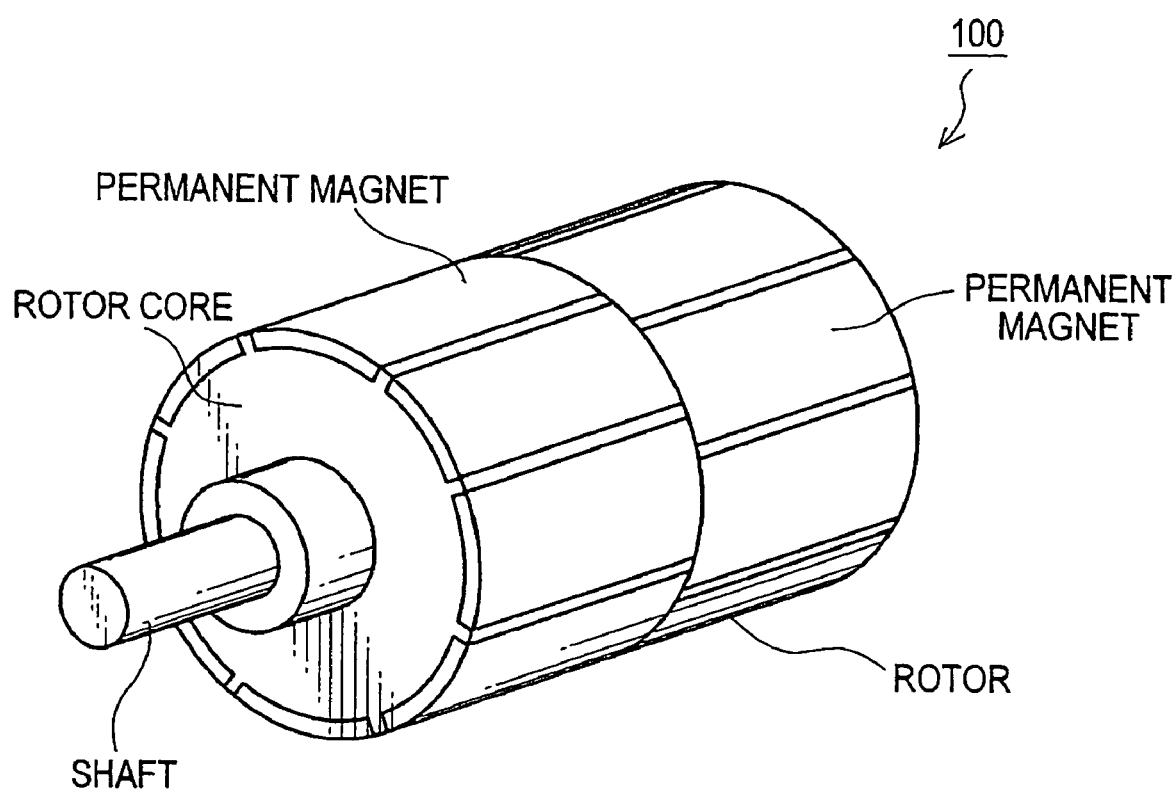
FIG. 12 is a perspective view of a rotor according to a prior art.
Figure 13:
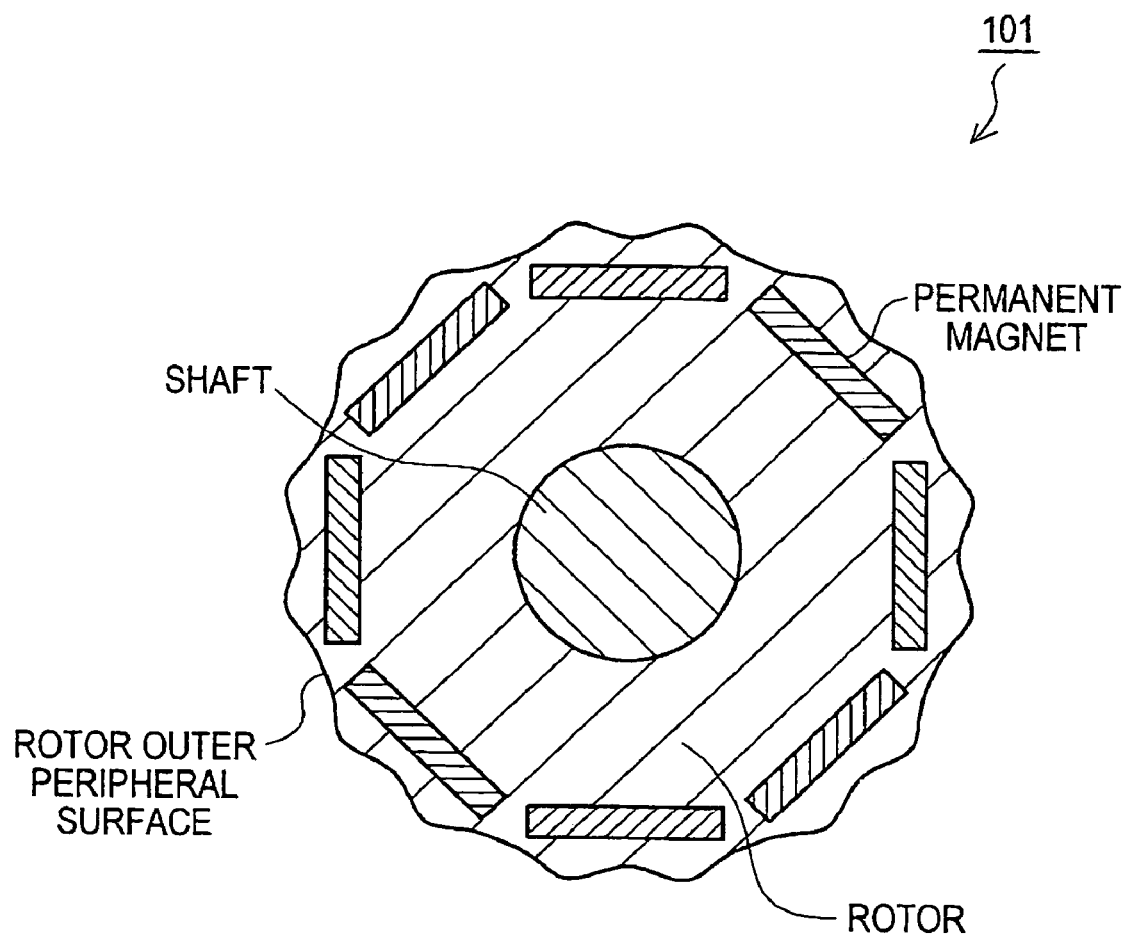
FIG. 13 is a sectional view of a rotor according to another prior art.

Next, referring to FIG. 11, a fifth embodiment of this invention will be described. In this embodiment, in a rotor core unit 12 similar to that of the first embodiment, the gaps formed in the outer peripheral surfaces of the first rotor core 120 and the second rotor core 121 are respectively filled with non-magnetic resins 120D and 121D.

In this embodiment, it is possible to enhance the strength of the rotor. Further, it is possible to prevent generation of noise during rotation and generation of energy loss due to air resistance.

It should be noted that such filling with resin is also possible in the rotor of the second embodiment, in which the through holes 122B and 123B are formed in the first rotor core 122 and the second rotor core 123. By thus filling the through holes 122B and 123B with resin, it is possible to enhance the strength of the rotor 10.

In the above-described embodiments, two gaps per permanent magnet are formed in the outer peripheral surface of the rotor. By increasing the number of gaps, it is possible to reduce the width of each gap. Further, by adjusting their number, it is possible to perform fine adjustment on the cogging torque.

Further, while in the above-described embodiments the number of poles of the rotor is eight, this invention is also applicable to cases in which the number of poles is other than eight.

Further, the rotor core is not restricted to one obtained by stacking together electromagnetic steel plates. It may also consist of a dust core.

The term "rotary electric machine" used in the above description generally refers to an electric motor and/or a power generator.

The gaps and through holes 120B through 129B in the above embodiments constitute the voids as referred to in the claims.

What is claimed is:

1. A rotor for a rotary electric machine, comprising:
   a rotation shaft;
   a plurality of rotor cores fixed to the rotation shaft and axially split, each of the rotor cores having an outer peripheral surface with a circular cross section; and
   permanent magnets arranged at equal circumferential intervals and extending through the rotor cores;
   wherein voids which axially penetrate the rotor cores are formed between the outer peripheral surfaces of the rotor cores and the permanent magnets, and the voids of two adjacent rotor cores are formed at circumferentially different positions,
   wherein two adjacent rotor cores are of the same specification with respect to the permanent magnets and the voids and are arranged in axially opposite directions, and
   wherein the voids of the rotor cores are arranged at equal angular intervals as seen from an axial direction.

2. The rotor as defined in claim 1, wherein the voids comprise grooves.

3. The rotor as defined in claim 1, wherein the voids comprise through holes axially extending through the rotor cores.

4. The rotor as defined in claim 1, wherein the rotor further comprises a non-magnetic resin material filling the voids.

5. The rotor as defined in claim 1, wherein the voids of the rotor cores are formed at two or more positions per permanent magnet.

6. The rotor as defined in claim 1, wherein the plurality of rotor cores comprises a first rotor core, a second rotor core, a third rotor core, and a fourth rotor core arranged axially in that order,
   wherein the first rotor core and the fourth rotor core are of the same specification with respect to the permanent magnets and the voids and are arranged axially in opposite directions, and
   wherein the second rotor core and the third rotor core are of the same specification with respect to the permanent magnets and the voids and are arranged axially in opposite directions.

* * * * *